United States Patent Office 3,362,841
Patented Jan. 9, 1968

3,362,841
COATING COMPOSITION AND METHOD FOR APPLYING SAME TO POLYOLEFIN FILMS
Virginia C. Menikheim, Chapel Hill, N.C., and Esther M. Rodriguez, La Grange Park, Ill., assignors to Union Carbide Corporation, a corporation of New York
No Drawing. Filed Dec. 30, 1963, Ser. No. 334,586
16 Claims. (Cl. 117—47)

ABSTRACT OF THE DISCLOSURE

The surface of polyolefin films are coated with a composition which renders the coated polyolefin film substantially impervious to oxygen and moisture vapor. The coating composition exhibits improved shelf life and contains a vinylidene chloride polymer, an organic acid, 2-ethylhexyl acrylate and ethyl acrylate.

---

This invention relates generally to coated polyolefin film and, more particularly, to polyolefin film having a polymeric coating composition thereon which is resistant to oils and solvents, has low oxygen and moisture vapor transmission values, and has low blocking value.

The invention further relates to the formation of coating latices of said polymeric compositions which are stabilized against shelf decay of the desirable coating characteristics of good wetting (or spreading), ready fusibility, and strong adhesion.

Polyolefin film has found widespread use as a wrapping and packaging material for many articles of commerce because of its flexibility, transparency, low moisture vapor permeability, resistance to the action of many chemicals, and similar allied properties. However, polyolefin films are also unduly permeable to oxygen and other gases and are generally not as resistant to essential oils, greases, and similar substances as is desired by the packaging industry.

It has recently been discovered that polyolefin films may be coated with resins comprising vinylidene chloride-containing copolymers, which coatings render such polyolefin films generally more impervious to most gases and sufficiently resistant to the action of most chemicals and greases for food packaging applications. It is generally convenient to apply such coatings from a latex form. However, the shelf life is generally rather short for the latex form which yields optimum coating characteristics for polymers high in vinylidene chloride content. This is undesirable for most applications since degradation in the coating characteristics of the latex may take place during or prior to shipment of the material. Further, short shelf life of the coating medium makes it difficult to arrange suitable plant coating schedules to conform with other plant operations.

It is, therefore, an object of this invention to provide a coating composition for use on polyolefin film which renders such film substantially impervious to oxygen and moisture vapor, and which coating composition also has improved shelf life.

It is another object of this invention to provide a polyolefin film coated with such compositions which is resistant to greases, oils, and most chemicals and which has a low blocking value.

Other and additional objects will become apparent from the following description.

Throughout the remainder of this specification, polyolefin films will be exemplified by polyethylene. It is understood, however, that the practice of this invention is not limited to pure or unmodified polyethylenes including both low and high density polyethylene, but is also applicable to other olefinic polymers such as polypropylene, polybutene and polystyrene to mixtures thereof, and to copolymers from mixtures of ethylene, propylene or butene monomers or polymers. The term, polyolefin film, is also meant to encompass such polymers to which have been added modifiers such as stabilizers, slip agents, pigments, anti-static agents, anti-blocking agents, anti-fog agents, and/or dyes in quantities conventionally employed for the intended purpose.

In accordance with the present invention, there is provided a polyolefin film having at least one surface coated with a vinylidene chloride polymer comprised of the polymerization product of 85 to 91 weight percent vinylidene chloride; 4 to 7 weight percent of an organic acid selected from the group consisting of itaconic acid, methacrylic acid, and acrylic acid; 6 to 9 weight percent 2-ethylhexyl acrylate; and 0.1 to 1.0 weight percent of ethyl acrylate based on the weight of the other three components. An optimum range of proportions is 87 to 89 percent vinylidene chloride, 6 to 8 percent 2-ethylhexyl acrylate, 4 to 6 percent acrylic acid, and 0.3 to 0.6 percent ethyl acrylate based on the total weight of the other three components. A preferred composition is 88 percent vinylidene chloride, 7 percent 2-ethylhexyl acrylate, 5 percent acrylic acid, and 0.4 percent ethyl acrylate based on the total weight of the other three components. All percentages herein are by weight unless otherwise specified.

There is also provided a method for producing such a film comprising modifying at least one surface of said polyolefin film to a wetting tension value of at least 41 dynes per centimeter; and coating said modified surface with the polymerization product of 85 to 91 weight percent vinylidene chloride, 4 to 7 weight percent acrylic acid, 6 to 9 weight percent 2-ethylhexyl acrylate and 0.1 to 1.0 weight percent ethyl acrylate based on the total weight of the other three components.

Of the polymerizable acids useful in this invention for forming the quaternary polymer, acrylic acid is preferred since it imparts somewhat better wettability properties to the coating composition and results in somewhat better adhesion of the coating to the base film than the other acids mentioned.

The proportions of vinylidene chloride useful in forming the quaternary polymer are critical in that when more than 91 percent of this material is used, the heat sealability properties of the resultant coated film are impaired. When less than 85 weight percent vinylidene chloride is used to form the quaternary polymer, the oxygen permeability of the film coated therewith tends to increase beyond the desired limits. Amounts not greater than 9 weight percent of 2-ethylhexyl acrylate should be used since higher proportions of this material tend to increase the oxygen permeability of the coated film. Less than 6 weight percent of this material results in a quaternary polymer yielding a coating which is somewhat brittle. More than 7 percent acrylic acid tends to increase the brittleness of the resultant polymer coating, whereas less than 4 percent acrylic acid results in polymers having nonuniform wettability with respect to the base film. More than 1.0 percent of ethyl acrylate based on the total weight of the other components results in polymers which when coated on polyolefin film produce a tacky coating which tends to cause the film to wrinkle and block on reeling, while less than 0.1 percent ethyl acrylate is not effective in increasing the shelf life of the latex coating composition.

While all the compositions within the above ranges are useful, it will be appreciated by those skilled in the art that for each particular composition of vinylidene chloride, organic acid, and 2-ethylhexyl acrylate, there will be an optimum percent of ethyl acrylate which provides a composition with maximum shelf coupled with optimized physical properties of the coated film. For example, in a composition of 88 percent vinylidene chloride, 7 percent 2-ethylhexyl acrylate, and 5 percent acrylic acid, the optimum range of ethyl acrylate is about 0.3 to 0.6 percent based on the total weight of the other three components.

The surface of the polyolefin film to be coated should have a wetting tension value such that it is wetted for a few seconds by liquids having a surface tension value of at least 41 dynes per centimeter.

The phrase "wetting tension" as used herein is defined as the minimum surface tension of a liquid mixture of formamide and Cellosolve that will not break up into droplets within a specified period of time, when said liquid is spread upon the polyolefin surface.

Although a specific mixture of liquid chemicals is used herein, it is to be understood that other liquids alone or in mixtures can be used to obtain the wetting tension values described. It being understood that when using other liquid chemicals, the wetting tension numerical values will not necessarily be the same. However, other liquid wetting tension values can be standardized against the formamide-Cellosolve mixture described herein.

The wetting tension values are obtained by the method described below.

A series of mixtures of chemically pure formamide and Cellosolve (2-ethoxyethanol) are prepared having the wetting tension values listed below:

| Formamide, Percent by Volume | Cellosolve, Percent | Wetting Tension, dynes/cm. |
| --- | --- | --- |
| 0.0 | 100.0 | 30 |
| 2.5 | 97.5 | 31 |
| 10.5 | 89.5 | 32 |
| 19.0 | 81.0 | 33 |
| 26.5 | 73.5 | 34 |
| 35.0 | 65.0 | 35 |
| 42.5 | 57.5 | 36 |
| 48.5 | 51.5 | 37 |
| 54.0 | 46.0 | 38 |
| 59.0 | 41.0 | 39 |
| 63.5 | 36.5 | 40 |
| 67.5 | 32.5 | 41 |
| 71.5 | 28.5 | 42 |
| 74.7 | 25.3 | 43 |
| 78.0 | 22.0 | 44 |
| 80.3 | 19.7 | 45 |
| 83.0 | 17.0 | 46 |
| 87.0 | 13.0 | 48 |
| 90.7 | 9.3 | 50 |
| 93.7 | 6.3 | 52 |
| 96.5 | 3.5 | 54 |
| 99.0 | 1.0 | 56 |
| 100.0 | 0 | 57 |

In practice each mixture is stored in a small mouth bottle supplied with a suitable cap to prevent evaporation and contamination. For fractional wetting tension values the mixtures may be prepared by extrapolating between the values listed in the table.

The procedure for testing the treated surface is carried out at a temperature of 20–25° C. and at relative humidity of 50% and is essentially as follows:

(1) A fresh cotton swab is wetted with one of the mixtures using a minimum amount of liquid.

(2) Using the cotton swab, the liquid is spread lightly over an area of approximately one square inch, using only one stroke to spread the liquid.

(3) The time required for the continuous film to break up into droplets is noted.

(4) The wetting tension value is taken as the value of that mixture which will break up into droplets in about two seconds. If a continuous film holds for more than about two seconds, proceed to the next higher surface tension mixture. If the continuous film breaks into droplets in less than about two seconds proceed to the next lower surface tension mixture. (Note: The continuous film may shrink in size about its periphery, but unless it breaks up in the interior in less than two seconds it is considered as wetting.)

A dye such as du Pont Victoria Blue may be added to the mixtures for ease of perceptibility. It is to be understood that the concentration and type of dye must be such as to not appreciably change the wetting tension values.

Since polyolefin films do not generally exhibit wetting tensions sufficiently high to make them amenable to coating with polymers according to this invention, it has been found expedient to modify the film surface to be coated to improve its surface characteristics, particularly their wetting tension values. Modification of the film surface to increase the wetting tension value of the surface to be coated may be accomplished by exposure of the surface to an open flame, chlorination under ultra-violet light, oxidation, high voltage stress accompanied by corona discharge, or other similar surface treating methods.

High voltage stress accompanied by corona discharge treatment is disclosed in British Patent No. 715,914. It has been found best when using low frequency corona discharge, to subject a polyolefin film surface to successive treatments of this nature, rather than attempting to properly modify the film surface in one treatment. One-treatment modification of a polyolefin film surface to a desired surface wetting tension may be accomplished using high frequency corona discharge techniques. In this particular invention it has been found that, while a wetting tension of 41 dynes per centimeter is sufficient for good coating adhesion, surfaces treated by corona discharge techniques are preferably modified to exhibit at least 54 dynes per centimeter wetting tension.

The treatment of polyolefin films by means of an open flame is disclosed in United States Patent No. 2,704,382. When surface modification by this technique is employed, a wetting tension value of at least 41 dynes per centimeter should be realized before attempting to apply an adherent coating to the surface.

Treatment of polyolefin film by chlorination under ultra-violet light is disclosed in United States Patent No. 2,502,841. Again, a wetting tension of at least 41 dynes per centimeter must be realized when using this type of treatment.

Treatment of polyolefin film may be accomplished by oxidation with ozone, dichromate salts, or permanganate salts.

Coating compositions according to this invention can be applied onto polyolefin films either from a latex, dispersion, emulsion or solution. It is preferred, however, to apply such coatings from a latex. For latex application, a mixture of monomers of the composition described above is blended with water and an emulsifier, acidified, mixed with a polymerization initiator and an activator, and agitated. The polymerization in a latex should be allowed to proceed to at least 95 percent conversion of monomer to polymer. Conversions less than 95 percent are not satisfactory because the resultant coatings tend to be streaked, cloudy, and generally exhibit lower adhesion values than do latices having greater than 95 percent conversion. One particular latex coating composition which was found to perform quite well was prepared by reacting a mixture of 32.6 percent of a monomeric mixture according to this invention; 65.6 percent oxygen-free water; about 1.3 percent aqueous sodium alcohol-sulfate emulsifier solution; 0.36 percent of 4 normal sulfuric acid; and 0.07 percent each of ammonium persulfate initiator and sodium metabisulfate activator. In the batch preparation of this specific latex, agitation was at 18 revolutions per minute for about four hours during which time the temperature was maintained at 35° C.

The latices used in this invention should be allowed to age for a short time in order to permit the resulting coated films to have low blocking values immediately after coating. The aging of the latex composition should not be allowed to proceed for too long a period, however, since prolonged aging permits the dispersed resin to crystallize to an excessive degree. A certain degree of crystallization is necessary to provide the coating composition with optimum oxygen barrier properties, but excessive crystallization is to be avoided because of difficulties in fusing the coating composition, which results in increased oxygen permeability of the coated film.

The thermal conditions necessary to fuse a coating applied to the base polyolefin film are related to the crystallinity of the resin in the latex particles comprising the coating in that an uncrystallized latex coating can be fused under much milder thermal conditions than a crystallized latex coating. The oxygen barrier properties of a coated polyolefin film are related to the extent of fusion of the coating on the polyolefin film. Optimum fusion and consequently optimum oxygen barrier properties are derived from latices in which the resin has not crystallized to an appreciable degree.

In general, it is preferred to age the latex for at least 48 hours after preparation so that sufficient crystallinity is obtained to provide a readily fusible component to result in a coated film having low blocking values coupled with low oxygen permeability. Aging of the latex compositions of this invention for periods in excess of its maximum usable shelf life is to be avoided to maintain good fusibility and low oxygen permeability of the coated film.

Where the coating composition is to be applied from a solution, it is preferred to polymerize by emulsion, bulk, or suspension polymerization to a conversion of between about 70 percent and about 90 percent with subsequent solution in a solvent which is totally vaporizable and which does not leave a residue upon evaporation. One example of such a solvent is tetrahydrofuran. It is practical to use a 10 percent polymer solution in this solvent for coating purposes.

A coating according to this invention can be applied by dipping, spraying, brushing, rolling, doctoring, painting or the like in a conventional manner. Polyolefin films coated with compositions according to this invention by any of the above methods must be dried to remove the solvent or carrier, whichever is present. This can be accomplished by passing the coated film through a heater, which can, for example, be an infra-red source. It has been found particularly expedient to use two sets of heating zones, the first being set at a somewhat lower temperature than the second in order to effect relatively gradual drying. Where the first heater was maintained between 55° C. and 60° C. and the second heater was maintained between 75° C. and 80° C., the coated film, polyethylene, was preferably fed through the heaters at 23.5 inches per minute. It is, of course, understood that these speeds and temperatures are not limiting factors in the practice of this invention. Modification will be available to those skilled in this art depending upon the specific coating composition, the thickness of the coating, the particular polyolefin film and the particular coating application method chosen. It has been found expedient to apply coatings of a thickness from about 0.005 to about 0.5 mil. It is preferred to use coating of a thickness between about 0.03 and about 0.08 mil.

Specific examples of polymeric compositions found useful as coatings in this invention and data showing their shelf life and blocking values appear in Table I below:

Polyethylene film 1.5 mils thick and having a density of 0.920 and a melt index of approximately 2.0 was coated with the coating compositions as shown in Table I. The coating composition, after being filtered through a 200 mesh screen, was placed in a tank at room temperature and aged for 48 hours prior to coating onto the polyethylene film. Pretreated polyethylene film surface treated to a wetting tension of at least 41 dynes per centimeter, was dipped in the coating composition and both sides of the film were coated. The coated film was then passed between two doctor bars whereby the excess latex was removed, then between two sets of infra-red heating panels where it was dried.

The lower set of heating panels was set at a temperature of 55° C. to 60° C. The upper set of heating panels was set at 75° C. to 80° C. The film traveled through the tank containing the coating composition and between the heating panels at the rate of 23½ inches per minute. The dried, coated film was reeled.

Initial blocking tests were carried out on the coated films within two to three days after final drying. Blocking tests on aged film were carried out on the coated film after the coated film has been allowed to age for approximately six months.

Each of the coating compositions was independently tested for maximum shelf life by applying the composition in the form of a latex to a polyethylene film and then testing the resulting coated film for oxygen transmission. The coated film was considered non-usable when the oxygen transmission was above 12 cc./100 sq. in./24 hrs./0.1 mil of coating.

TABLE I

| Example No. | 1 | 2 | 3 | 4 | 5 | 6 | 7 | 8 | 9 |
|---|---|---|---|---|---|---|---|---|---|
| Coating Resin Composition (Percent by Weight): | | | | | | | | | |
| Vinylidene Chloride | 89 | 88 | 88 | 89 | 89 | 89 | 88 | 88 | 88 |
| 2-ethylhexyl Acrylate | 8 | 8 | 7 | 8 | 8 | 8 | 8 | 7 | 7 |
| Acrylic Acid | 3 | 4 | 5 | 3 | 3 | 3 | 4 | 5 | 5 |
| Ethyl Acrylate* | 0 | 0 | 0 | 0.2 | 0.3 | 0.5 | 0.5 | 0.25 | 0.5 |
| Blocking Value of Coated Film: | | | | | | | | | |
| Initial | 40 | 40 | 30 | 195 | 220 | 270 | 150 | 40–50 | 65–83 |
| Aged | 10 | 20 | 10 | 75 | 70 | 90 | 50 | 15–0 | 15 |
| Maximum Shelf-life in Days | 5 | 5 | 6 | 7 | 7 | 7 | 8 | 9 | 13 |

*Value based upon total weight of other monomer constituents.

Blocking values shown in Table I are a measure of the force required to separate 16 square inches of film from another identical film while applying a force increasing at the rate of 10 grams per minute to these films. The test by which these data are obtained consists of pressing together two strips of film each 4 inches by 5 inches under a 30 pound load for 3 days at 49° C. After this time, the films are manually separated for ½ inch on each short end thus leaving 4 inch squares of film adhered to each other. One film is attached to a fixed plate 4 inches by 4 inches through the separated half inch on each end of the film. The other film is attached to a movable plate also 4 inches by 4 inches through the separated half inch on each end of the film. The movable plate is on one arm of the balance until the films separate. The weight recorded at film separation is the blocking value.

As shown in Table I, the range of ingredients of the coating composition is critical. As can be readily seen, the inclusion of the ethyl acrylate in the polymerization product extends the maximum shelf life of coating latex from 5 to 6 days, as illustrated in Examples 1 to 3, to a maximum shelf life as high as 13 days, as shown in Examples 7 to 9. Further, the increase in shelf life of the latex is obtained without any substantial effect on the blocking values of the coated film.

The criticality of the composition is further shown in that a small variation in the amount of acrylic acid produces a substantial increase in the blocking values of the coated film, as can be seen from a comparison of Examples 4 to 6 and 7 to 9. It can also be seen that the inclusion of the ethyl acrylate into the polymerization product of this invention as shown in Examples 7 to 9 enhance the shelf life of the coating latex to a greater extent than the inclusion of the ethyl acrylate to the compositions shown in Examples 4 to 6.

It is, of course, within the spirit and scope of this invention to slightly modify the coating composition or the coated film composition by adding dyes, pigments, slip agents, stabilizers, plasticizers, anti-fog agents, antistatic agents or other similar substances thereto.

What is claimed is:

1. A coating composition for a barrier coating on polyolefin film comprised of the polymerization product consisting essentially of the monomers of 85 to 91 weight percent vinylidene chloride; 4 to 7 weight percent polymerizable acid selected from the group consisting of acrylic acid, methacrylic acid, and itaconic acid; 6 to 9 weight percent 2-ethylhexyl acrylate; and 0.1 to 1.0 weight percent ethyl acrylate based on the total weight of the other three components.

2. The coating composition of claim 1 in the form of a latex.

3. A coating composition according to claim 1 wherein said composition is in the form of a latex and has been aged at room temperature for a period of at least 48 hours.

4. The coating composition of claim 3 in the form of a latex.

5. A coating composition according to claim 1 wherein said composition is in the form of a latex and has a crystallinity equal to that obtained by aging the freshly prepared latex composition at room temperature for a period of at least about 48 hours.

6. A coating composition as claimed in claim 1 comprised of the polymerization product consisting essentially of the monomers of 87 to 89 weight percent vinylidene chloride; 4 to 6 weight percent acrylic acid; and 6 to 8 weight percent 2-ethylhexyl acrylate; and 0.3 to 0.6 weight percent of ethyl acrylate based on the weight of the other components.

7. A polyolefin film having a polymeric, oxygen impervious coating on at least one surface thereof which coating comprises the polymerization product consisting essentially of the monomers of 85 to 91 weight percent vinylidene chloride; 4 to 7 weight percent polymerizable acid selected from the group consisting of acrylic acid, methacrylic acid, and itaconic acid; 6 to 9 weight percent 2-ethylhexyl acrylate, and 0.1 to 1.0 weight percent ethyl acrylate based on the total weight of the other three components.

8. A coated polyolefin film as claimed in claim 7 wherein said coating is the polymerization product consisting essentially of the monomers of 87 to 89 weight percent vinylidene chloride; 4 to 6 weight percent acrylic acid; 6 to 8 weight percent 2-ethylhexyl acrylate; and 0.3 to 0.6 weight percent ethyl acrylate based on the total weight of the other components.

9. A polyolefin film having a polymeric, oxygen impervious coating on at least one surface thereof, said surface having a wetting tension of at least 41 dynes per centimeter and said coating comprising the polymerization product consisting essentially of the monomers of 85 to 91 weight percent vinylidene chloride; 4 to 7 weight percent polymerizable acid selected from the group consisting of acrylic acid, methacrylic acid, and itaconic acid; 6 to 9 weight percent 2-ethylhexyl acrylate; and 0.1 to 1.0 weight percent ethyl acrylate based on the total weight of the other three components.

10. The method of making a polyolefin film which is substantially impervious to oxygen and water vapor, which method comprises treating at least one surface of said polyolefin film to attain a wetting tension value of at least 41 dynes per centimeter; and coating said treated surface with the polymerization product of 85 to 91 weight percent vinylidene chloride, 4 to 7 weight percent polymerizable acid selected from the group consisting of acrylic acid, methacrylic acid and itaconic acid, 6 to 9 weight percent 2-ethylhexyl acrylate, and 0.1 to 1.0 weight percent ethyl acrylate based on the total weight of the other components.

11. The method claimed in claim 10 wherein the coating composition is in the form of a latex.

12. The method of claim 10 wherein said polymerization product is in the form of a latex and is aged at room temperature for a period of at least about 48 hours.

13. The method of claim 10 wherein said polymerization product is in the form of a latex and has a crystallinity equal to that obtained by aging the freshly prepared latex composition at room temperature for a period of at least about 48 hours.

14. The method of making a polyolefin film which is substantially impervious to oxygen and water vapor, which method comprises treating at least one surface of said polyolefin film to attain a wetting tension value of at least 41 dynes per centimeter; and coating said treated surface with the polymerization product of 87 to 89 weight percent vinylidene chloride, 4 to 6 weight percent acrylic acid, 6 to 8 weight percent 2-ethylhexyl acrylate, and 0.3 to 0.6 weight percent ethyl acrylate based on the total weight of the other components.

15. The method of claim 14 wherein the coating composition is in the form of a latex.

16. The method of making a polyolefin film which is substantially impervious to oxygen and water vapor which comprises coating a polyolefin surface having a wetting tension of at least 41 dynes per centimeter with the polymerization product of 85 to 91 weight percent vinylidene chloride; 4 to 7 weight percent of an organic acid selected from the group consisting of acrylic, methacrylic and itaconic acid; 6 to 9 weight percent 2-ethylhexyl acrylate; and 0.1 to 1.0 weight percent ethyl acrylate based on the total weight of the other components.

References Cited

UNITED STATES PATENTS

| 3,041,208 | 6/1962 | Hay et al. | 260—29.6 |
| 3,255,034 | 6/1966 | Covington et al. | 117—138.8 |

FOREIGN PATENTS

| 654,342 | 6/1951 | Great Britain. |

WILLIAM D. MARTIN, *Primary Examiner.*

R. HUSACK, *Assistant Examiner.*